(12) United States Patent  
Naka (10) Patent No.: US 10,073,322 B2  
(45) Date of Patent: Sep. 11, 2018

(54) IMAGE CAPTURING APPARATUS AND METHOD OF CONTROLLING THE SAME

(71) Applicant: CANON KABUSHIKI KAISHA, Tokyo (JP)

(72) Inventor: Yasutaka Naka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/679,281

(22) Filed: Aug. 17, 2017

(65) Prior Publication Data

US 2018/0059509 A1     Mar. 1, 2018

(30) Foreign Application Priority Data

Aug. 26, 2016   (JP) ................................. 2016-166012

(51) Int. Cl.
| | | |
|---|---|---|
| G03B 3/10 | (2006.01) | |
| G03B 13/36 | (2006.01) | |
| H04N 9/04 | (2006.01) | |
| G02B 7/28 | (2006.01) | |
| H04N 5/232 | (2006.01) | |

(52) U.S. Cl.  
CPC .............. *G03B 3/10* (2013.01); *G02B 7/28* (2013.01); *G03B 13/36* (2013.01); *H04N 5/23212* (2013.01); *H04N 9/04* (2013.01)

(58) Field of Classification Search  
None  
See application file for complete search history.

(56) References Cited

U.S. PATENT DOCUMENTS

| 5,498,944 A * | 3/1996 | Nakata | ................ G02B 7/36 |
| | | | 318/375 |
| 9,762,803 B2 * | 9/2017 | Kunugi | ............... G02B 27/646 |
| 2003/0063322 A1* | 4/2003 | Itoh | .................... H04N 1/2112 |
| | | | 358/302 |
| 2012/0133821 A1* | 5/2012 | Takaiwa | ........... H04N 5/23209 |
| | | | 348/345 |

FOREIGN PATENT DOCUMENTS

JP     2015-040968 A     3/2015

* cited by examiner

*Primary Examiner* — James Hannett  
(74) *Attorney, Agent, or Firm* — Cowan, Liebowitz & Latman, P.C.

(57) ABSTRACT

An image capturing apparatus, comprises an image sensor having a focus detection pixel; a focus detection unit configured to perform focus detection, by using a signal from the focus detection pixel; a focus adjustment unit configured to control focus adjustment of an imaging lens; a lock unit configured to lock the focus adjustment of the imaging lens; and a control unit configured to control so as to, if the focus adjustment of the imaging lens is caused to transition from a locked state to a state where the focus adjustment lock is cancelled in continuous shooting, temporarily cause the continuous shooting to stop, and, after performing the focus adjustment of the imaging lens and confirming that the imaging lens has focused on the subject, restart the continuous shooting.

10 Claims, 5 Drawing Sheets

IMAGE CAPTURING APPARATUS AND METHOD OF CONTROLLING THE SAME

BACKGROUND OF THE INVENTION

Field of the Invention

The present invention relates to an image capturing apparatus having a servo AF continuous shooting function.

Description of the Related Art

Conventionally, a digital camera equipped with a servo AF (servo auto focus) continuous shooting function that can perform continuous shooting while continuing to focus on a subject is known. In a case of performing servo AF, AF of a so-called contrast detection method has been performed in a mirrorless camera or a compact digital camera that is not equipped with a focus detection sensor. More specifically, the contrast of a subject in a video signal of a plurality of frames outputted from an image sensor is evaluated, and focus on the subject, which moves, is performed so that a contrast value becomes high. Meanwhile, in recent years digital cameras of a so-called on-imaging surface phase difference AF method capable of detecting, by a phase difference detection method, a focus from imaging data by using an image sensor in which focus detection pixels are embedded have been put to practical use.

A characteristic of on-imaging surface phase difference AF is that it is possible to obtain a focus position from one frame of image data in accordance with a condition whereas contrast-detection type AF requires a plurality of the frame images for a contrast calculation. By this characteristic of on-imaging surface phase difference AF, it is possible to realize high-speed servo AF that is capable of focus tracking, even if only one frame between continuous shooting frames can be used for AF processing.

Japanese Patent Laid-Open No. 2015-40968 discloses a method for solving a problem of the focus tracking ceasing to be possible in a case where high-speed is prioritized and a restriction is put on a scan range, in servo AF that uses contrast-detection type AF.

SUMMARY OF THE INVENTION

The present invention provides an image capturing apparatus that, in a case of performing servo AF, can shorten a period necessary for a return to a state where focus tracking is possible even if focus greatly deviates temporarily.

According to a first aspect of the present invention, there is provided an image capturing apparatus, comprising: an image sensor having a focus detection pixel; a focus detection unit configured to perform focus detection of a phase difference detection method, by using a signal from the focus detection pixel; a focus adjustment unit configured to control focus adjustment of an imaging lens, by using an output of the focus detection unit; a lock unit configured to lock the focus adjustment of the imaging lens; and a control unit configured to control so as to, if the focus adjustment of the imaging lens is caused to transition by the lock unit from a locked state to a state where the focus adjustment lock is cancelled in continuous shooting for continuously capturing a subject by the image sensor, temporarily cause the continuous shooting to stop, and, after performing focus adjustment of the imaging lens by the focus adjustment unit and confirming that the imaging lens has focused on the subject, restart the continuous shooting.

According to a second aspect of the present invention, there is provided a method of controlling an image capturing apparatus provided with an image sensor having a focus detection pixel, a focus detection unit that performs focus detection of a phase difference detection method by using a signal of the focus detection pixel, and a focus adjustment unit that performs focus adjustment of an imaging lens by using an output of the focus detection unit, the method comprising: locking the focus adjustment of the imaging lens in continuous shooting that continuously captures a subject by the image sensor; canceling the focus adjustment lock from a state where focus adjustment of the imaging lens has been locked by the locking; and controlling so as to restart the continuous shooting after accepting that the focus adjustment lock has been cancelled, causing the continuous shooting to temporarily stop, performing the focus adjustment of the imaging lens by the focus adjustment unit, and confirming that the imaging lens focused on the subject.

Further features of the present invention will become apparent from the following description of exemplary embodiments with reference to the attached drawings.

DESCRIPTION OF THE EMBODIMENTS

In a system where the number of frames that can be used in focus detection between continuous shooting frames for servo AF is limited, in a case where it is possible to maintain a continuous shooting speed and continue focus tracking, a deviation amount for a focus position between continuous shooting frames is limited to a comparatively small value. However, in a case such as where focus tracking between frames is stopped due to a focus lock operation by a user, the amount of focus deviation from a subject becomes large, and a situation in which tracking cannot be accurately performed in a limited number of frames occurs. For example, there are situations where deviation of focus from the subject is large, such as in a case where a focus lock is temporarily performed because a main subject is lost from view and the main subject is re-framed while shooting. In a heavily blurred state where there is a large difference between the position of a subject and an in-focus position (a focus position), it is difficult to return to focus tracking in a small number of frames because the accuracy of data for on-imaging surface phase difference AF focus detection decreases. Therefore, the inventors of the present invention focused on the possibility of the occurrence of a problem that images in which focus has deviated are shot when continuous shooting is performed before focus tracking returns, and came to an invention of an image capturing apparatus that can shorten a period necessary to return to a state in which focus tracking is possible, even when a focus lock has been stopped.

Explanation in detail is given below with reference to the attached drawings, regarding embodiments of the present invention.

Figure 1:
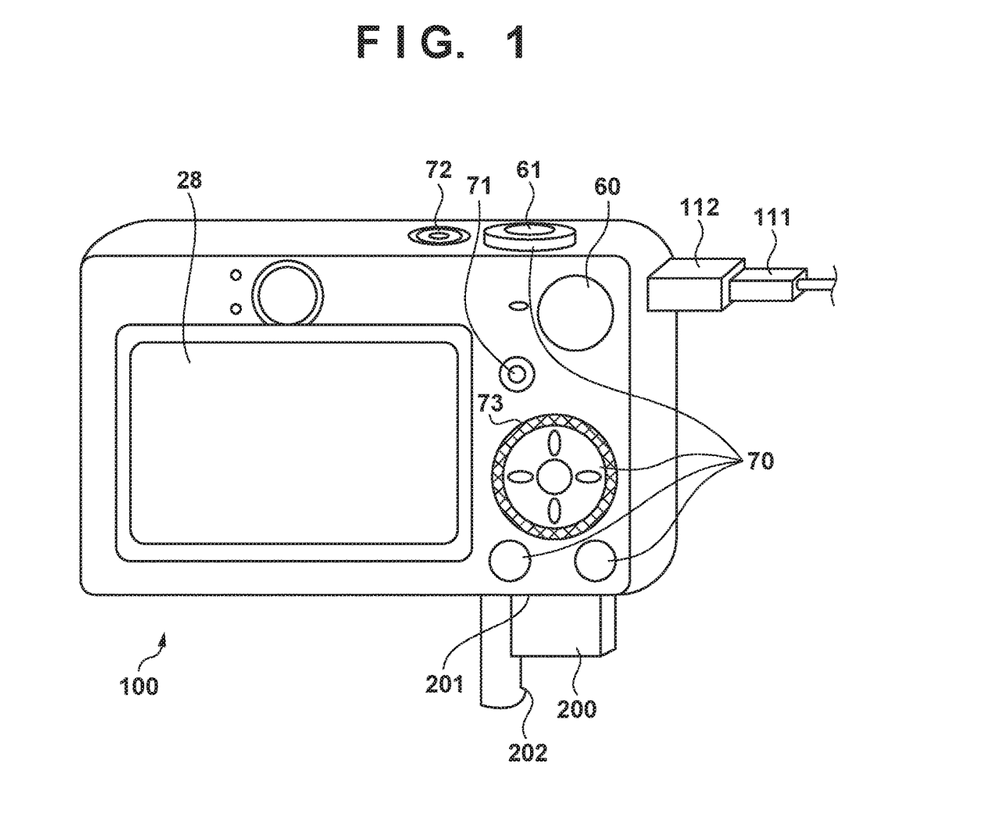
FIG. 1 is a perspective view of an image capturing apparatus according to an embodiment of the present invention.

FIG. 1 is a view that illustrates an outer appearance of the digital camera 100 which is an embodiment of an image capturing apparatus of the present invention.

In FIG. 1, a display unit 28 displays an image or various information. A shutter button 61 is an operation member for performing a shooting instruction. A mode change switch 60 can switch between various modes of the digital camera 100. A connector 112 connects a connection cable 111 for connecting an external device such as a personal computer or a printer to the digital camera 100. An operation unit 70 comprises, for example, a touch panel, a button, and various switches for accepting various operations from a user. A focus lock button 71 is included in the operation unit 70, and in a period while the focus lock button 71 is being pressed by a user, focus is locked and a focus tracking operation is temporarily stopped.

A controller wheel 73 is an operation member capable of being operated in accordance with rotation, and is included in the operation unit 70. A power supply switch 72 is a button that is pressed for switching between power on and power off. A recording medium 200 comprises a memory card, a hard disk, or the like, and records captured image data or the like. A recording media slot 201 contains the recording medium 200. When the recording medium 200 is contained in the recording media slot 201, communication between the recording medium 200 and the digital camera 100 becomes possible, and recording or playback of image data is performed. A lid 202 is provided on the recording media slot 201, and can be opened and closed. In FIG. 1, a state where the lid 202 is open and part of the recording medium 200 has been extracted from the slot 201 and exposed is illustrated.

Figure 2:
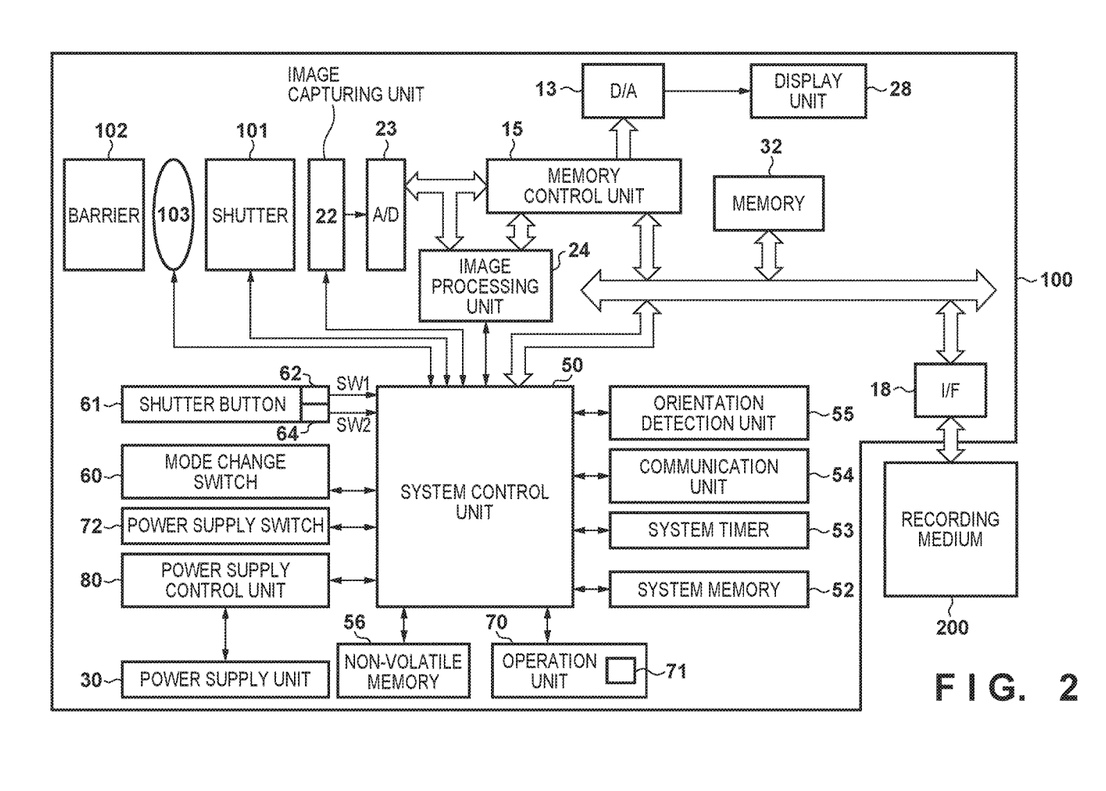
FIG. 2 is a block diagram that illustrates a configuration of the image capturing apparatus according to the embodiment of the present invention.

FIG. 2 is a block diagram that illustrates a configuration of the digital camera 100 of the present embodiment. In FIG. 2, an imaging lens 103 is comprised from a lens group that includes a zoom lens and a focus lens. A shutter 101 is provided with an aperture function and a function for opening and closing a light path. An image capturing unit 22 is configured by an image sensor such as a CCD or CMOS sensor that converts an optical image to an electrical signal. An A/D converter 23 converts an analog signal to a digital signal. The A/D converter 23 is used for converting an analog signal outputted from the image capturing unit 22 to a digital signal. A barrier 102 prevents a breakage or dirtiness of an imaging system that includes the imaging lens 103, the shutter 101 and the image capturing unit 22 by covering the imaging system that includes the imaging lens 103 of the digital camera 100. Note that the image sensor arranged in the image capturing unit 22 has focus detection pixels, and can perform focus detection of the phase difference detection method in an image capturing plane.

Note that, in the present embodiment and the present invention, it is assumed that a focus detection pixel is not just a pixel dedicated to focus detection, but comprises a pixel that can be used for both capturing (recording of a subject image) and focus detection. An example of a pixel dedicated to focus detection may be a pixel in which a portion of the pixel (for example a right half) is occluded, and photoelectric conversion is performed only for light that passes through a portion of an exit pupil of an imaging optical system. Because an output signal from such a pixel that is dedicated to focus detection has parallax with an output signal from a pixel for which a portion of the pixel (for example a left half) is similarly occluded and for which photoelectric conversion is performed for only light that passes through a different region of the exit pupil, it is possible to perform focus detection of a phase difference detection method. In addition, an example of pixels that can be used in capturing and focus detection may be pixels for which a plurality of photoelectric conversion units (photoelectric conversion units A and B) are arranged in a single pixel, and photoelectric conversion is performed for light that has passed through regions of the exit pupil that differ respectively for the photoelectric conversion unit A and the photoelectric conversion unit B. In the case of these pixels, because an output signal from the photoelectric conversion unit A and an output signal from the photoelectric conversion unit B have parallax, it is possible to perform focus detection of a phase difference detection method. In addition, it is possible to obtain an output signal for capturing by adding the output signal from the photoelectric conversion unit A and the output signal from the photoelectric conversion unit B or by simultaneously reading the charge from the two photoelectric conversion units as the charge from a single pixel.

An image processing unit 24 performs a predetermined pixel interpolation, resizing processing such as reducing, or color conversion processing, with respect to data from the A/D converter 23 or data from a memory control unit 15. In addition, the image processing unit 24 has a function for obtaining and computing an output value from focus detection pixels out of captured image data, and a system control unit 50 performs exposure control and focus detection control based on an acquired computation result. By this, TTL (through the lens) type AF (auto focus) processing, AE (auto exposure) processing, and EF (pre-flashing) processing are performed. The image processing unit 24 also performs predetermined computational processing using captured image data, and performs AWB (auto white balance) processing of a TTL method based on an acquired computation result.

Output data from the A/D converter 23 is directly written to a memory 32, via the image processing unit 24 and the memory control unit 15 or via the memory control unit 15. The memory 32 stores image data for displaying on the display unit 28, or image data that is acquired by the image capturing unit 22 and converted into digital data by the A/D converter 23. The memory 32 is provided with sufficient storage capacity to store a predetermined number of still images or a predetermined period of moving images and audio.

In addition, the memory 32 serves as a memory for image display (a video memory). A D/A converter 13 converts data for image display that is stored in the memory 32 into an analog signal and supplies it to the display unit 28. In this way, image data for display that is written to the memory 32 is displayed by the display unit 28 via the D/A converter 13. The display unit 28 performs a display in accordance with the analog signal from the D/A converter 13, on a display device such as an LCD. By performing an analog conversion by the D/A converter 13 of a digital signal accumulated in the memory 32 that was once subject to an A/D conversion by the A/D converter 23, and successively transferring the converted digital signal to the display unit 28 and displaying it, the display unit 28 can function as an electronic view finder and perform a live-view display.

The image capturing unit 22 has a plurality of operation modes in accordance with an objective, including a full-pixel readout drive for a still image recording, a low rate thinning readout consecutive drive for a live-view display, or a high rate thinning readout consecutive drive for an auto-focus operation. The system control unit 50 separately uses each operation mode in accordance with an operation state of the digital camera 100.

A non-volatile memory 56 is a recording medium such as a memory for which electrically deleting/recording is possible, and for example an EEPROM or the like may be employed. Stored in the non-volatile memory 56 is, for example, a program and constants for operation of the system control unit 50. This program is a computer program for executing various flowcharts that are described later in the present embodiment.

The system control unit 50 controls the digital camera 100 as a whole. By executing the program recorded in the non-volatile memory 56 described above, processing of the present embodiment that is described later is realized. RAM is used for a system memory 52. A program read from the non-volatile memory 56, variables or constants for operation of the system control unit 50, or the like are loaded into the system memory 52. In addition, the system control unit 50 also performs display control by controlling the memory 32, the D/A converter 13, the display unit 28, or the like.

A system timer 53 measures a time used in various control or a time of a clock that is integrated. The mode change switch 60, the shutter button 61, and the operation unit 70 are used for inputting various operation instructions to the system control unit 50. The mode change switch 60 switches the operation mode of the system control unit 50 to one of still image recording modes, moving image capturing modes, a playback mode, or the like. As modes included in the still image recording modes, there are an automatic shooting mode, an auto scene mode, a manual mode, various scene modes that have different shooting settings for each shooting scene, a program AE mode, a custom mode, or the like. Any of these modes, which are included in menu buttons, are directly switched to by the mode change switch 60. Alternatively, configuration may be taken to use another operation member to switch to any of these modes included in the menu buttons after first switching to the menu button by the mode change switch 60. Similarly, a plurality of modes may be included in the moving image capturing mode.

A first shutter switch 62 is turned on by a so-called half press (a shooting preparation instruction) part way through an operation of the shutter button 61 provided on the digital camera 100, and generates a first shutter switch signal SW1. In accordance with the first shutter switch signal SW1, an operation, such as AF (auto focus) processing, AE (auto exposure) processing, AWB (auto white balance) processing, EF (pre-flashing) processing, or the like starts.

A second shutter switch 64 becomes ON with a so-called full press (a shooting instruction) that is completion of operation of the shutter button 61, and generates a second shutter switch signal SW2. The system control unit 50 starts a series of shooting processing operations from reading a signal from the image capturing unit 22 to writing image data to the recording medium 200, in accordance with the second shutter switch signal SW2.

The operation members of the operation unit 70 act as various function buttons to which are assigned functions appropriate to each scene, in accordance with selecting and operating various function icons displayed on the display unit 28. As function buttons, there is a terminate button, a back button, an image scrolling button, a jump button, a narrow-down button, an attribute modify button, or the like, for example. For example, when a menu button is pressed, various settable menu screens are displayed on the display unit 28. A user can intuitively perform various settings by using a menu screen displayed on the display unit 28, an up, down, left, and right 4-way directional button, and a SET button.

The controller wheel 73 is an operation member included in the operation unit 70 that can be operated in accordance with rotation, and for example is used together which a directional button when making an instruction for a selection item. When the controller wheel 73 is operated in accordance with rotation, an electrical pulse signal in accordance with an operation amount is generated, and the system control unit 50 controls the units of the digital camera 100 based on this pulse signal. In accordance with this pulse signal, it is possible to determine for example an angle of a rotation operation on the controller wheel 73 or a number of rotations performed. Note that the controller wheel 73 may be anything if it is an operation member for which a rotation operation can be detected. For example, the controller wheel 73 may be a dial operation member that itself rotates and generates a pulse signal in accordance with a rotation operation by a user. In addition, configuration may be taken such that the controller wheel 73 itself does not rotate but detects a rotation operation of a user's finger on the controller wheel 73, by an operation member that comprises a touch sensor.

A power supply control unit 80 is configured by for example a battery detection circuit, a DC-DC converter, and a switch circuit for switching a block to energize, and detects the existence or absence of the attachment of a battery, a type of the battery, and a remaining capacity of the battery. In addition, the power supply control unit 80, based on a detection result and an instruction by the system control unit 50, controls the DC-DC converter and supplies each unit, which includes the recording medium 200, with a necessary voltage for a necessary period.

A power supply unit 30 comprises a primary battery such as an alkaline battery or a lithium battery, a secondary battery such as an NiCd battery, an NiMH battery, or an Li-ion battery, an AC adapter, or the like. A recording medium I/F 18 is an interface with the recording medium 200, which is a memory card, a hard disk, or the like. The recording medium 200 is a recording medium such as a memory card that is for recording a shot image, and is configured from a semiconductor memory, an optical disc, a magnetic disk, or the like.

A communication unit 54 performs transmission/reception of a video signal, a voice signal or the like in accordance with wireless or a wired cable. The communication unit 54 can connect to a wireless LAN (a Local Area Network) as well as the Internet. The communication unit 54 can transmit an image captured by the image capturing unit 22 (including a through-the-lens image) or an image recorded in the recording medium 200, and can receive image data or various other information from an external device.

An orientation detection unit 55 detects an orientation of the digital camera 100 with respect to a direction of gravity. Based on the orientation detected by the orientation detection unit 55, it is possible to determine whether an image shot by the image capturing unit 22 is an image shot while the digital camera 100 is set up horizontally or an image shot while the digital camera 100 is set up vertically. The system control unit 50 can add orientation information in accordance with the orientation detected by the orientation detection unit 55 to an image file of an image captured by the image capturing unit 22, rotate the image and then record it.

An acceleration sensor, a gyro sensor, or the like can be used as the orientation detection unit 55.

Next, using FIG. 2 through FIG. 5, explanation is given regarding operation of the digital camera 100 according to embodiments of the present invention.

In FIG. 2, when the first shutter switch 62 is turned on, the system control unit 50 starts AE/AF, and, in alignment with change of a subject, sets exposure conditions and performs control of focus tracking (focus adjustment). Subsequently, when the second shutter switch 64 is turned on, the system control unit 50 switches to a still image capturing operation, and a continuous shooting sequence is started if a continuous shooting setting for continuously shooting a subject has been performed. Note that although FIG. 2 indicates a configuration of a digital camera having an integrated lens, the present invention can also be applied to a lens-interchangeable type digital camera. In such a case, the system control unit 50 can perform focus adjustment control by transmitting information necessary for focus adjustment, such as a defocus amount or a lens driving amount, to a control unit for controlling lens driving in an attached lens instead of a lens driving unit in the camera. The control unit in the lens performs focus adjustment control by controlling the driver for driving the lens.

Figure 3:
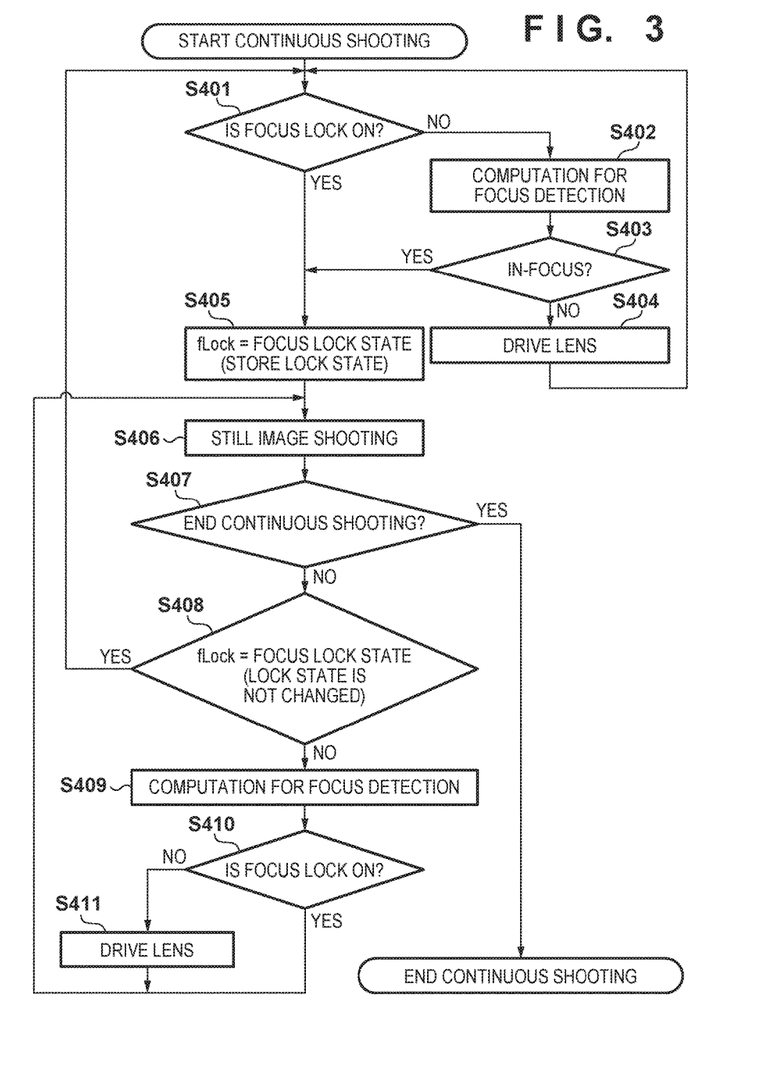
FIG. 3 is a flowchart illustrating a servo AF continuous shooting operation of an image capturing apparatus.

FIG. 3 is a flowchart that illustrates a flow for a relationship between a shooting operation and an AF (auto focus) operation if continuous shooting is performed. Here, in particular, regarding a relationship between a shooting operation and an operation for on/off of a focus lock during continuous shooting that is characteristic in the present embodiment, explanation is given regarding continuous shooting sequences in the order of:

(1) a case where a focus lock instruction by the focus lock button 71 is not initially performed, and a focus lock instruction is not performed even part way through continuous shooting (case of no focus lock instruction);

(2) a case where a focus lock instruction is initially performed, and the focus lock instruction is not canceled even part way through continuous shooting (a case where there is a focus lock instruction);

(3) a case where a focus lock instruction is not initially performed, and a focus lock instruction is performed part way through continuous shooting (a case of focus lock: OFF→ON);

(4) a case where, after a focus lock instruction is performed, the focus lock instruction is canceled part way through continuous shooting (a case of focus lock: ON→OFF).

(1) Case of No Focus Lock Instruction

In this case, in FIG. 3, processing advances in the order of step S401→step S402→step S403→step S404→step S405→step S406→step S407→step S408→step S409→step S410→step S411→(loop of step S406 through step S411).

Firstly, the system control unit 50 confirms that a focus lock instruction has not been performed by a user by the focus lock button 71 (step S401), and performs computational processing for focus detection (step S402). In computational processing for focus detection, focus detection is performed by using the image processing unit 24 to obtain focus detection data (a pair of parallax image signals), based on output values of the focus detection pixels, from one frame's worth of image data read from the image capturing unit 22, and performing a correlation computation that uses the parallax image signals. The focus detection data can be obtained from image data that is obtained at time immediately prior to still image shooting.

The system control unit 50 determines whether a result of the focus detection computation is that an in-focus state has been entered (step S403), and if it is determined that the in-focus state has been entered (step S403: Yes), the processing proceeds to step S405, and a shooting operation. If out-of-focus is determined (step S403: No), the lens is driven until the in-focus position calculated in step S402 (step S404), and the focus detection computation and lens driving are repeatedly performed until in-focus is determined.

The system control unit 50 stores a state of the focus lock button 71 when starting the shooting operation (step S405). Here, because a focus lock instruction has not been performed, that the focus lock is in an OFF state is stored.

The system control unit 50 switches the image capturing unit 22 to full-pixel readout, and performs a still image exposure and a readout operation (step S406). Subsequently, the second shutter switch 64 is turned off, and it is determined whether a continuous shooting end instruction has been performed (step S407), and if an end instruction has been performed the continuous shooting operation ends.

If a continuous shooting end instruction has not been performed, it is confirmed that the instruction to have the focus lock off has not changed (step S408), and computational processing for focus detection of step S409 is performed. The computational processing for focus detection is performed by using the image processing unit 24 to obtain or compute output values of the focus detection pixels from one frame's worth of image data read from the image capturing unit 22. After performing a focus detection computation, the system control unit 50 drives the focus lens to the in-focus position (step S411), returns to step S406 and enters a subsequent shooting operation.

In this way, if there is no focus lock instruction, by limiting focus detection computation between frames of continuous shooting to one frame's worth, and not confirming an in-focus state after lens driving (the loop of step S406 through step S411), high-speed servo AF continuous shooting is realized. Note that configuration is taken such that the focus detection data is obtained from one frame's worth of image data in step S409, but image data at a time of still image shooting may be used. It is possible to improve a continuous shooting frame speed by restricting a number of times that focus detection data is obtained to a predetermined number of frames or fewer between frames or still images. In addition, if the number of times focus detection data is obtained per one shooting is restricted, it is possible to achieve a similar effect even if a focus detection computation including focus detection data obtained in the past is performed.

Figure 4:
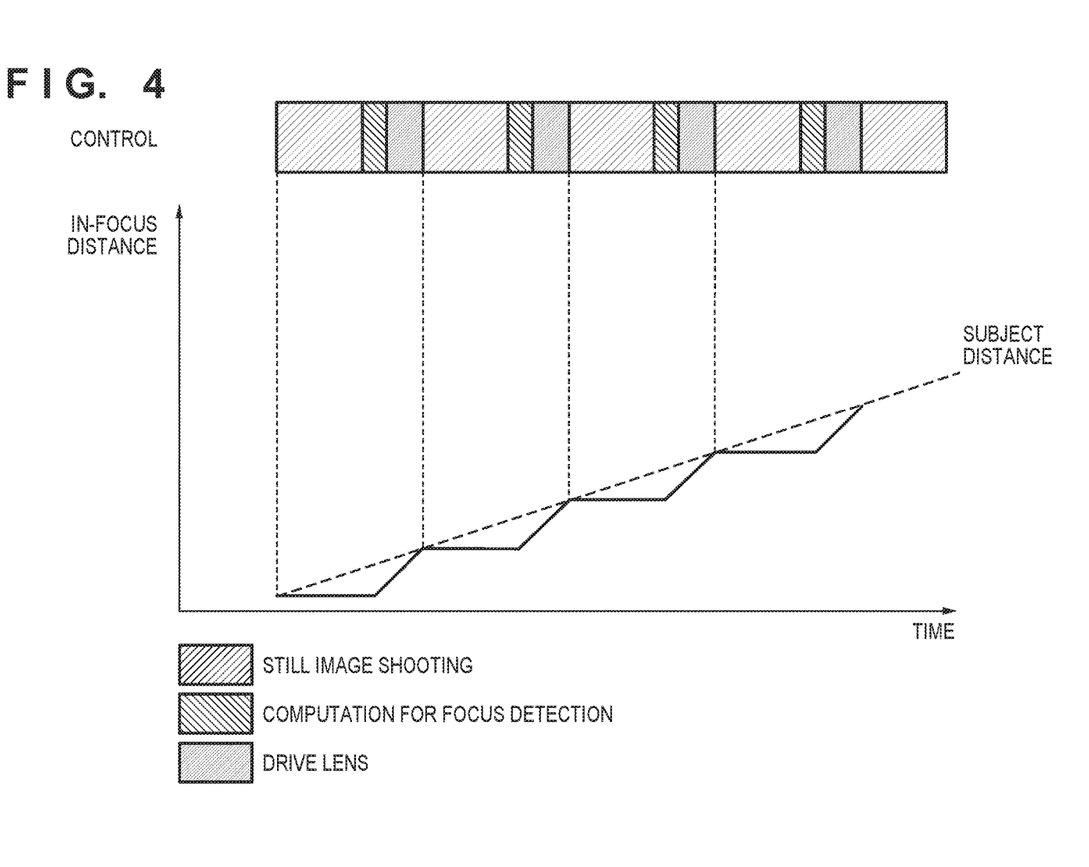
FIG. 4 is a conceptual diagram illustrating a servo AF continuous shooting operation of an image capturing apparatus.

FIG. 4 is a view illustrating a focus tracking operation with respect to a subject for which a distance with respect to the digital camera 100 is linearly moving at a time of the aforementioned servo AF continuous shooting. In this way, in a state where it is possible to execute high-speed shooting, focus detection computation, and lens driving in synchronization, it is possible to cause focus to be tracked to a subject without problem even if the number of times that focus detection data is obtained is restricted.

(2) Case where there is a Focus Lock Instruction

In this case, processing in FIG. 3 proceeds in the order of step S401→step S405→step S406→step S407→step S408→step S409→step S410→(loop of step S406 through step S410).

Firstly, the system control unit 50 confirms that a focus lock instruction in accordance with the focus lock button 71 has been performed by a user (step S401), and the processing proceeds to step S405.

The system control unit 50 stores a state of the focus lock button 71 when starting the shooting operation (step S405). Here, because a focus lock instruction has been performed, that the focus lock is in an on state is stored.

The system control unit 50 switches the image capturing unit 22 to full-pixel readout, and performs a still image exposure and a readout operation (step S406). Subsequently, the second shutter switch 64 is turned off, and it is determined whether a continuous shooting end instruction has been performed (step S407), and if an end instruction has been performed the continuous shooting operation ends.

If a continuous shooting end instruction has not been performed, it is confirmed that there is no change for an instruction to have the focus lock on (step S408), and the computational processing for focus detection of step S409 is performed. The computational processing for focus detection is performed by using the image processing unit 24 to obtain or compute output values of the focus detection pixels, from one frame's worth of image data read from the image capturing unit 22. After performing the focus detection computation, the system control unit 50 does not perform lens driving, but returns to step S406 and performs subsequent still image shooting.

Here, if a focus lock instruction is performed, it is not necessary to perform a focus detection computation between shots. However, by obtaining focus detection data in advance, it is possible to perform a focus detection computation in consideration of the focus detection data obtained here if the focus lock instruction is canceled. That is, it is possible to more promptly perform focus tracking when the focus lock instruction is canceled.

(3) Case of Focus Lock: OFF→ON

In this case, in FIG. 3, processing advances in the order of step S401→step S402→step S403→step S404→step S405→step S406→step S407→step S408→step S401→step S405→step S406→step S407→step S408→step S409→step S410→(loop of step S406 through step S410).

Firstly, the system control unit 50 confirms that a focus lock instruction in accordance with the focus lock button 71 has not been performed by a user (step S401), and performs computational processing for focus detection (step S402). In the computational processing for focus detection, focus detection is performed by using the image processing unit 24 to obtain or compute output values of the focus detection pixels, from one frame's worth of image data read from the image capturing unit 22.

The system control unit 50 determines whether a result of the focus detection computation is that an in-focus state has been entered (step S403), and if it is determined that the in-focus state has been entered (step S403: Yes), the processing proceeds to step S405, and a shooting operation. If out-of-focus is determined (step S403: No), the lens is driven until the in-focus position calculated in step S402 (step S404), and the focus detection computation and lens driving are repeatedly performed until in-focus is determined.

The system control unit 50 stores a state of the focus lock button 71 when starting the shooting operation (step S405). Here, because a focus lock instruction has not been performed, that the focus lock is in an off state is stored. Note that it is assumed that the focus lock is subsequently switched from off to on.

The system control unit 50 switches the image capturing unit 22 to full-pixel readout, and performs a still image exposure, and a readout operation (step S406). Subsequently, the second shutter switch 64 is turned off, and it is determined whether a continuous shooting end instruction has been performed (step S407), and if an end instruction has been performed the continuous shooting operation ends.

When a continuous shooting end instruction is not performed, it is determined whether there is a change in the focus lock instruction (step S408). Here, because the focus lock is switched from off to on after step S405, it is determined that there is a change in the focus lock instruction, and the processing returns to step S401.

Step S401 and thereafter have an operation flow that is similar to the processing of "the case where there is a focus lock instruction" explained in (2).

(4) Case of Focus Lock: ON→OFF

Next, explanation is given regarding operation in a case where the focus lock state changes from on to off during continuous shooting, which is a characteristic of the present embodiment. Here, explanation is given regarding operation in a case where, after the focus lock is turned on in (3) above, the focus lock is turned off again.

In such a case, in step S408 which is part way through the loop of step S406 through step S410 of the above (2), it is determined that the focus lock has been switched from on to off, continuous shooting is temporarily stopped, and the processing returns to step S401.

It is then determined in step S401 that the focus lock is off, and computational processing for focus detection is performed (step S402). In the computational processing for focus detection, focus detection is performed by using the image processing unit 24 to obtain or compute output values of the focus detection pixels, from one frame's worth of image data read from the image capturing unit 22.

The system control unit 50 determines whether a result of the focus detection computation is that an in-focus state has been entered (step S403), and if it is determined that the in-focus state has been entered (step S403: Yes), the processing proceeds to step S405, and a shooting operation. If out-of-focus is determined (step S403: No), the lens is driven until the in-focus position calculated in step S402 (step S404), and the focus detection computation and lens driving are repeatedly performed until in-focus is determined.

Step S405 and thereafter have an operation flow that is similar to the processing of "case of no focus lock instruction" explained in (1).

In this way, when the focus lock is switched from on to off during continuous shooting, the operations of step S402 through step S404 are performed, and after performing a focus detection and confirming an in-focus state, the processing switches to the continuous shooting operation loop of step S406 through step S411 again. Therefore, it is possible to prioritize and perform focus adjustment (distance measurement computation and lens driving) over shooting until an in-focus state is confirmed, and it is possible to cause focus tracking immediately after the focus lock is switched from on to off to promptly return to a state of being focused on the subject.

In the configuration for servo AF continuous shooting of the present embodiment, in the case of no focus lock instruction, shooting, focus detection computation, and lens driving are repeated in synchronization at a certain degree of speed. By this, it is possible to cause focus tracking on a subject even in a state where a number of times that focus detection data is obtained in a continuous shooting period is restricted. In contrast to this, when shooting is continued in a situation where a focus lock instruction has been performed, there is the possibility that a difference between a subject position and an in-focus position will increase.

With respect to such a problem, in the present embodiment, when the focus lock is switched from on to off, focus detection computation and lens driving is repeated until it is possible to confirm that focus has been achieved again by a focus detection computation. By subsequently restarting continuous shooting, it is possible to promptly refocus on a main subject, and it becomes possible to avoid a problem where many images in which focus has deviated are shot.

Furthermore, it also becomes possible to efficiently refocus on the main subject, by using a calculated focus detection computation result or image data (shooting data obtained by continuous shooting) that is obtained in a continuous shooting period in a focus lock state, at a time of a focus detection computation immediately after the focus lock is canceled. This is because it is possible to shorten the time for a focus detection computation immediately after the focus lock is cancelled by using a focus detection computation result or image data obtained in a continuous shooting period in the focus lock state and omitting time that would have been incurred to obtain the result or image data. If it is possible to perform focus adjustment by using a focus detection computation result as is, it is also possible to omit a focus detection computation for immediately after the cancellation of the focus lock. In a case of using image data obtained in a continuous shooting period in the focus lock state, focus detection data may be obtained from the image data after the focus lock is cancelled, or a correlation computation that uses focus detection data obtained during a focus lock state after the focus lock is cancelled may be performed. Note that, in a case of using a calculated focus detection computation result or image data obtained in a continuous shooting period in the focus lock state, it is desirable to use a focus detection computation result or image data obtained at least immediately prior to the cancellation of the focus lock.

Figure 5:
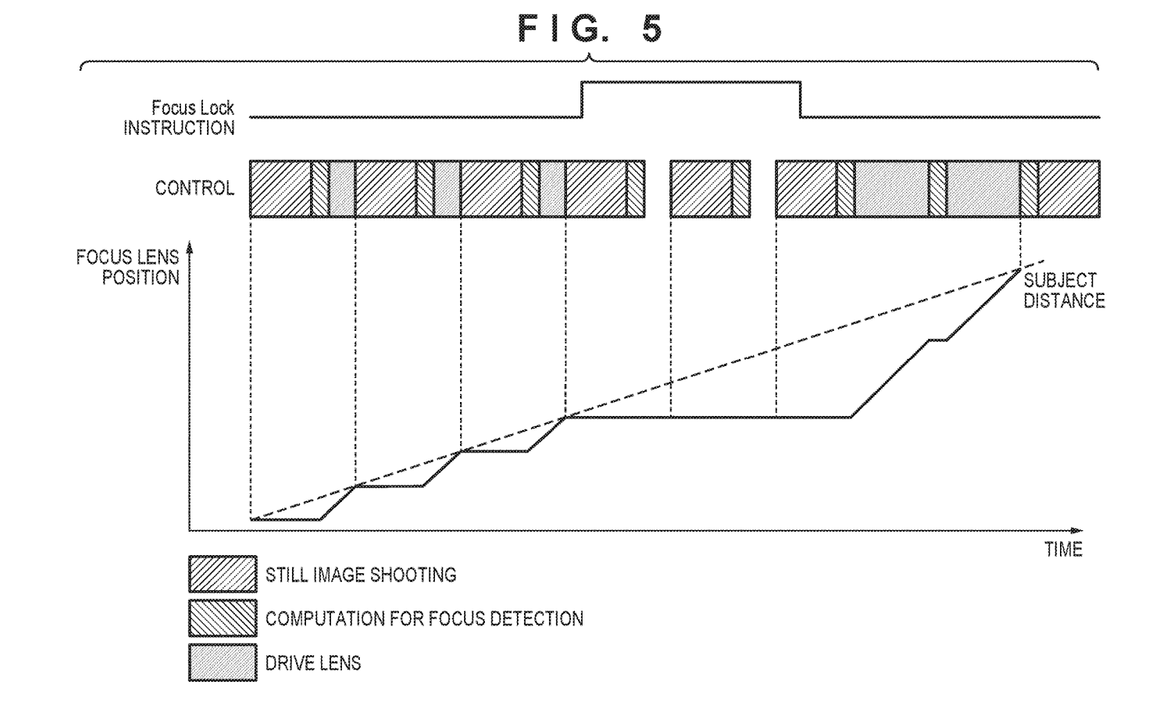
FIG. 5 is a conceptual diagram illustrating a servo AF continuous shooting operation of an image capturing apparatus.

FIG. 5 is a view that illustrates a focus tracking operation with respect to a subject whose distance with respect to the digital camera 100 is linearly moving in the case that the focus lock state goes from off→on→off part way through servo AF continuous shooting explained above. In this way, in a situation where the focus lock state has changed from the on state to the off state, it is possible to promptly perform focus tracking with respect to a subject and return to a high-speed continuous shooting state.

Thus, it is possible to a provide an image capturing apparatus capable of shooting a focused image, even at a time of a return from a situation where focus temporarily greatly deviated, in servo AF continuous shooting where a number of frames for focus detection is restricted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-166012, filed Aug. 26, 2016, which is hereby incorporated by reference herein in its entirety.

What is claimed is:

1. An image capturing apparatus, comprising:
an image sensor having a focus detection pixel;
a focus detection unit configured to perform focus detection of a phase difference detection method, by using a signal from the focus detection pixel;
a focus adjustment unit configured to control focus adjustment of an imaging lens, by using an output of the focus detection unit;
a lock unit configured to lock the focus adjustment of the imaging lens; and
a control unit configured to control so as to, if the focus adjustment of the imaging lens is caused to transition by the lock unit from a locked state to a state where the focus adjustment lock is cancelled in continuous shooting for continuously capturing a subject by the image sensor, temporarily cause the continuous shooting to stop, and, after performing focus adjustment of the imaging lens by the focus adjustment unit and confirming that the imaging lens has focused on the subject, restart the continuous shooting.

2. The image capturing apparatus according to claim 1, wherein the focus detection unit performs focus detection of the subject even in a period where focus adjustment of the imaging lens is locked.

3. The image capturing apparatus according to claim 2, wherein, in focus adjustment of the imaging lens that is performed until the continuous shooting is restarted after the continuous shooting temporarily stops, the focus adjustment unit performs the focus adjustment of the imaging lens by using a result of the focus detection by the focus detection unit in a period where the focus adjustment of the imaging lens is locked.

4. The image capturing apparatus according to claim 1, wherein, in focus adjustment of the imaging lens that is performed until the continuous shooting is restarted after the continuous shooting temporarily stops, the focus adjustment unit uses a result of focus detection that uses a signal based on shot data obtained by the continuous shooting in a period where the focus adjustment of the imaging lens is locked.

5. The image capturing apparatus according to claim 1, wherein the focus detection unit performs focus detection by using image data of a predetermined number of frames or less, with respect to one frame of still image shooting.

6. The image capturing apparatus according to claim 5, wherein the focus detection unit performs focus detection by using image data of one frame, with respect to one frame of still image shooting.

7. The image capturing apparatus according to claim 5, wherein, in a case where the focus adjustment locked state of the imaging lens is canceled in the continuous shooting, the control unit performs the continuous shooting while causing the focus adjustment unit to perform focus adjustment of the imaging lens based on a result of focus detection by the focus detection unit that is performed by using the image data of the predetermined number of frames or less.

8. The image capturing apparatus according to claim 7, wherein, in a case where there is no change from the focus adjustment locked state of the imaging lens in the continuous shooting, the control unit performs the continuous shooting without confirming that the subject is focused on in accordance with the focus adjustment by the focus adjustment unit.

9. The image capturing apparatus according to claim 1, wherein the focus detection pixel is used in the focus detection by the focus detection unit and obtainment of shooting data in the continuous shooting by the image sensor.

10. A method of controlling an image capturing apparatus provided with an image sensor having a focus detection pixel, a focus detection unit that performs focus detection of a phase difference detection method by using a signal of the focus detection pixel, and a focus adjustment unit that performs focus adjustment of an imaging lens by using an output of the focus detection unit, the method comprising:
  locking the focus adjustment of the imaging lens in continuous shooting that continuously captures a subject by the image sensor;
  canceling the focus adjustment lock from a state where focus adjustment of the imaging lens has been locked by the locking; and
  controlling so as to restart the continuous shooting after accepting that the focus adjustment lock has been cancelled, causing the continuous shooting to temporarily stop, performing the focus adjustment of the imaging lens by the focus adjustment unit, and confirming that the imaging lens focused on the subject.

* * * * *